(12) United States Patent
Kwon et al.

(10) Patent No.: US 12,086,242 B2
(45) Date of Patent: Sep. 10, 2024

(54) STORAGE DEVICE AND METHOD FOR PROTECTING AGAINST VIRUS/MALWARE THEREOF AND COMPUTING SYSTEM HAVING THE SAME

(71) Applicant: Samsung Electronics Co., Ltd., Suwon-si (KR)

(72) Inventors: Seongnam Kwon, Bucheon-si (KR); Jisoo Kim, Seongnam-si (KR); Taeseok Hwang, Seongnam-si (KR); Chanik Park, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/132,766

(22) Filed: Dec. 23, 2020

(65) Prior Publication Data

US 2021/0117540 A1      Apr. 22, 2021

Related U.S. Application Data

(62) Division of application No. 15/609,164, filed on May 31, 2017, now Pat. No. 10,909,238.

(30) Foreign Application Priority Data

Sep. 13, 2016    (KR) .................. 10-2016-0117913

(51) Int. Cl.
| | | |
|---|---|---|
| G06F 21/00 | (2013.01) |
| G06F 3/06 | (2006.01) |
| G06F 21/33 | (2013.01) |
| G06F 21/44 | (2013.01) |
| G06F 21/55 | (2013.01) |
| G06F 21/56 | (2013.01) |

(52) U.S. Cl.
CPC .......... *G06F 21/554* (2013.01); *G06F 3/0622* (2013.01); *G06F 3/0634* (2013.01); *G06F 3/0673* (2013.01); *G06F 21/33* (2013.01); *G06F 21/44* (2013.01); *G06F 21/567* (2013.01); *G06F 21/568* (2013.01); *G06F 3/0659* (2013.01); *G06F 2221/031* (2013.01)

(58) Field of Classification Search
None
See application file for complete search history.

(56) References Cited

U.S. PATENT DOCUMENTS

| 7,679,133 B2 | 3/2010 | Son et al. |
| 7,712,132 B1 | 5/2010 | Ogilvie |

(Continued)

FOREIGN PATENT DOCUMENTS

| CN | 103413090 A | 11/2013 |
| CN | 105809055 A | 7/2016 |

OTHER PUBLICATIONS

Machine Translation of Chang, CN 105809055 (Year: 2016).*

(Continued)

*Primary Examiner* — Jeffery L Williams
(74) *Attorney, Agent, or Firm* — Harness, Dickey & Pierce, P.L.C.

(57) ABSTRACT

Disclosed is an operating method of a storage device, which includes detecting virus/malware, performing an authentication operation with a host device when the virus/malware is detected, and entering a recovery mode when the authentication operation indicates that authentication is successful.

7 Claims, 14 Drawing Sheets

(56) References Cited

U.S. PATENT DOCUMENTS

| | | |
|---|---|---|
| 8,046,547 B1 | 10/2011 | Chatterjee et al. |
| 8,091,115 B2 | 1/2012 | Abzarian et al. |
| 8,392,989 B2 | 3/2013 | Upadhyay |
| 8,553,466 B2 | 10/2013 | Han et al. |
| 8,559,235 B2 | 10/2013 | Yoon et al. |
| 8,578,179 B2 | 11/2013 | Aciicmez et al. |
| 8,654,587 B2 | 2/2014 | Yoon et al. |
| 9,027,148 B2 | 5/2015 | Thadikaran et al. |
| 9,038,176 B2 | 5/2015 | Sallam |
| 9,064,116 B2 | 6/2015 | Triantafillou et al. |
| 9,223,969 B2 | 12/2015 | Yoo |
| 10,140,454 B1 | 11/2018 | Spath et al. |
| 10,437,997 B2 * | 10/2019 | Friedrichs ............... G06F 16/13 |
| 2008/0162915 A1 | 7/2008 | Price et al. |
| 2008/0263378 A1 | 10/2008 | Challener et al. |
| 2011/0233648 A1 | 9/2011 | Seol et al. |
| 2012/0047580 A1 | 2/2012 | Smith et al. |
| 2012/0185683 A1 | 7/2012 | Krstic et al. |
| 2012/0254993 A1 | 10/2012 | Sallam |
| 2012/0254995 A1 | 10/2012 | Sallam |
| 2012/0255017 A1 | 10/2012 | Sallam |
| 2013/0097681 A1 | 4/2013 | Jaber et al. |
| 2013/0198474 A1 | 8/2013 | Shaath |
| 2013/0318610 A1 | 11/2013 | Zaitsev |
| 2014/0181971 A1 | 6/2014 | Tatarinov et al. |
| 2015/0205959 A1 | 7/2015 | Friedrichs et al. |
| 2016/0378691 A1 | 12/2016 | Sherman |
| 2017/0076096 A1 | 3/2017 | Challener et al. |
| 2017/0097828 A1 | 4/2017 | Kim et al. |
| 2017/0206353 A1 | 7/2017 | Jai et al. |
| 2017/0270293 A1 | 9/2017 | Gu et al. |
| 2017/0300692 A1 | 10/2017 | Robison et al. |
| 2017/0364681 A1 | 12/2017 | Roguine et al. |
| 2017/0371573 A1 | 12/2017 | Kim et al. |
| 2018/0007069 A1 | 1/2018 | Hunt et al. |
| 2018/0018458 A1 | 1/2018 | Schmugar et al. |
| 2018/0024893 A1 | 1/2018 | Sella et al. |
| 2018/0048658 A1 | 2/2018 | Hittel et al. |
| 2018/0075236 A1 | 3/2018 | Kwon et al. |
| 2018/0189300 A1 | 7/2018 | Shaath |
| 2018/0225458 A1 | 8/2018 | Austin et al. |
| 2019/0173675 A1 | 6/2019 | Kaufman |

OTHER PUBLICATIONS

Paik et al. "Poster: Self-Defensible Storage Devices based on Flash memory against Ransomware" 37th IEEE Symposium on Security and Privacy, May 23-25, 2016.

Non-Final Office Action dated Aug. 21, 2019 in U.S. Appl. No. 15/609,164.

Final Office Action dated Nov. 27, 2019 in U.S. Appl. No. 15/609,164.

Non-Final Office Action dated Mar. 19, 2020 in U.S. Appl. No. 15/609,164.

Notice of Allowance dated Sep. 22, 2020 in U.S. Appl. No. 15/609,164.

Yang et al., "When poll is better than interrupt," Proceedings of the 10th USENIX conference on File and Storage Technologies, Feb. 2012, p. 1-7.

"IEEE 100, The Authoritative Dictionary of IEEE Standards Terms," 7th ed., IEEE Press, 2000, p. 57-58 and 742-743. (Year: 2000).

"Asynchronous," Merriam-Webster.com Dictionary, Merriam-Webster, https:www.merriamwebster.com/dictionary/asynchronous. Accessed Mar. 14, 2020. (Year:2020).

"Start-Stop Making Sense", Feb. 2, 1995, yale.edu, http://pcit.cis.yale.edu/pcit/COMISDN/STRTSTOP.HTM, accessed Mar. 14, 2020 (Year: 1995).

"Asynchronous Communication," Techopedia.com, Sep. 25, 2014, https://www.techopedia.com/definition/17031/asynchronous-communication-data-transmission: accessed Mar. 14, 2020 (Year 2014).

"Asynchronous Transmission," Techopedia.com, Jul. 29, 2012, https://www.techopedia.com/definition/6051/asynchronous-transmission;Accessed Mar. 14, 2020 (Year: 2012).

\* cited by examiner

STORAGE DEVICE AND METHOD FOR PROTECTING AGAINST VIRUS/MALWARE THEREOF AND COMPUTING SYSTEM HAVING THE SAME

CROSS-REFERENCE TO RELATED APPLICATIONS

This U.S. non-provisional patent application is a Divisional Application of U.S. application Ser. No. 15/609,164, filed on May 31, 2017, which claims priority under 35 U.S.C. § 119 to Korean Patent Application No. 10-2016-0117913 filed on Sep. 13, 2016, the entire contents of which are incorporated herein by reference.

BACKGROUND

Embodiments of the inventive concepts described herein relate to a storage device and a method for protecting against virus/malware and a computing system including the same.

Ransomware is a type of computer virus that covertly encrypts important data of a user computer and does not decrypt the covertly encrypted data until money is paid, thus causing the user significant damage if the money is not paid. Since encryption algorithms (e.g., AES256 and RSA2048) known as being sufficiently robust are used, if an attacker does not provide a decryption key, most infections are incurable. Accordingly, infection prevention is being emphasized as a measure of combatting ransomeware. However, there is still no solution for fundamentally preventing a computer from being infected with a virus. As ransomware that infects a website, a spam mail, or an application through fragile security thereof appears without intermission, the user may be exposed to high infection danger.

SUMMARY

A method of operating a storage device includes detecting malware; performing an authentication operation with a host device when the malware is detected; and entering a recovery mode when the authentication operation is successful.

An operating method of a storage device includes receiving an input/output request from an external device; detecting whether malware is included in the input/output request; requesting a certification from the external device when the malware attack is detected; determining whether an authentication operation is successful, by verifying the certification from the external device; and entering a protection mode when the authentication operation is not successful.

A storage device includes a memory area having a protected area that stores a trap file accessible when an authentication operation with a host device is successful; and an anti-malware unit configured to detect malware by analyzing a pattern of data corresponding to an input/output request received from the host device or determining whether the input/output request attempts to access or modulate a trap file.

A computing system includes a storage device comprising a protected area that stores a trap file and an anti-malware unit that detects malware; and a host device configured to manage the storage device based on a host program, wherein the host program generates the trap file and stores the trap file in the protected area, and wherein the anti-malware unit first requests authentication from the host device when the host device attempts to access the trap file.

A method of operating a storage device including receiving a trap file; storing the trap file in the storage device; and receiving, from a host device, a data access request for accessing the trap file; and in response to receiving the data access request for accessing the trap file, transitioning the storage device to a system lock state; performing an authentication operation with a host device; and releasing the system lock state based on the authentication operation.

BRIEF DESCRIPTION OF THE FIGURES

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
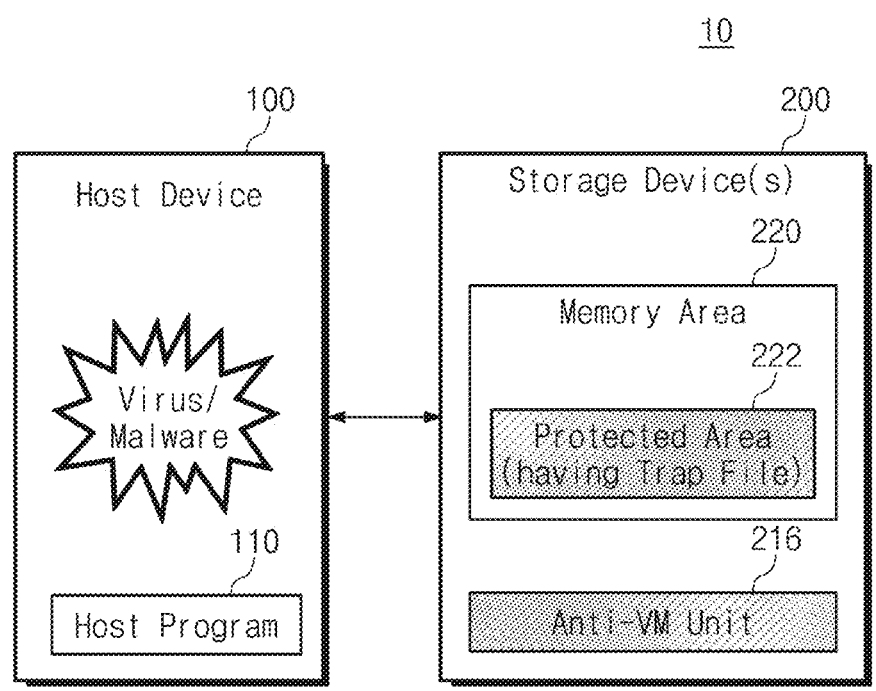
FIG. 1 is a drawing illustrating a computing system for describing at least one example embodiment of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a drawing illustrating a computing system 10 for describing at least one example embodiment of the inventive concepts. Referring to FIG. 1, the computing system 10 may include a host device 100 and at least one storage device 200.

The computing system 10 may be used as, for example, a computer, a portable computer, an ultra-mobile personal computer (UMPC), a workstation, a data server, a net-book, a personal digital assistant (PDA), a web tablet, a wireless phone, a mobile phone, a smartphone, an e-book, a portable multimedia player (PMP), a digital camera, a digital audio recorder/player, a digital picture/video recorder/player, a portable game machine, a navigation system, a black box, a 3D television, a device capable of transmitting and receiving information wirelessly, one of various electronics devices constituting a home network, one of various electronics devices constituting computer network, one of various electronics devices constituting telematics network, a radio-frequency identification (RFID), or one of various electronic devices constituting a computing system.

The host device 100 may be implemented to control overall operations of the computing system 10. The host device 100 may include at least one of a processor, an application processor (AP), a central processing unit (CPU), a graphic processing unit (GPU), an arithmetic device, etc. The host device 100 may be implemented to write or read data in or from the storage device 200.

According to at least one example embodiment of the inventive concepts, the host device 100 may be implemented to detect or remove a virus or a malware (short for "malicious software"). Examples of malware include computer viruses, computer worms, trojan horses, adware, ransomware, and/or other software intended to damage or take at least partial control over a computer system.

According to at least one example embodiment of the inventive concepts, the host device 100 may include a host program 110 that manages the storage device 200.

The storage device 200 may be connected to the host device 100 to store data. For example, the storage device 200 may be a solid state drive (SSD), a hard disk drive (HDD), a multimedia card (MMC), an embedded multimedia card (eMMC), a memory card, a 3D-Xpoint memory, a dual in-line memory module (DIMM), a non-volatile DIMM (NVDIMM), universal flash storage (UFS), embedded UFS (eUFS), etc.

The storage device 200 may include an anti-virus/malware (anti-VM) unit 216 and a memory area 220.

According to at least one example embodiment of the inventive concepts, the anti-VM unit 216 may be implemented to detect a virus or malware from data received in the storage device 200 and to enter a protection mode in response to the detection of the virus or malware. Here, when entering the protection mode, the storage device 200 may block an access of the host device 100 or may allow the access as read-only.

According to at least one example embodiment of the inventive concepts, the anti-VM unit 216 may request authentication from the host device 100 upon detecting the virus or malware. For example, the anti-VM unit 216 may request certification from the host device 100.

According to at least one example embodiment of the inventive concepts, the anti-VM 216 may be implemented with hardware/software/firmware.

According to at least one example embodiment of the inventive concepts, the anti-VM unit 216 may be optionally activated by the host device 100. According to at least another example embodiment of the inventive concepts, the anti-VM unit 216 may be activated according to an internal policy of the storage device 200. According to at least another example embodiment of the inventive concepts, the anti-VM unit 216 may be selectively activated by a user.

According to at least one example embodiment of the inventive concepts, the Anti-VM unit 216 may include or be implemented by one or more circuits or circuitry (e.g., hardware) specifically structured to carry out and/or control some or all of the operations described in the present disclosure as being performed by the Anti-VM unit 216 (or an element thereof). According to at least one example embodiment of the inventive concepts, the Anti-VM unit 216 may include or be implemented by a memory and one or more processors executing computer-readable code (e.g., software and/or firmware) that is stored in the memory and includes instructions for causing the one or more processors to carry out and/or control some or all of the operations described herein as being performed by the Anti-VM unit 216 (or an element thereof). According to at least one example embodiment of the inventive concepts, the Anti-VM unit 216 may be implemented by, for example, a combination of the above-referenced hardware and processors executing computer-readable code.

The memory area 220 may be implemented to store data. According to at least one example embodiment of the inventive concepts, the memory area 220 may be a volatile memory (e.g., a dynamic random access memory (DRAM) or a static random access memory (SRAM)), a nonvolatile memory (e.g., an magneto-resistive random access memory (MRAM) or a flash memory), or a platter of the hard disk drive (HDD).

The memory area 220 according to at least one example embodiment of the inventive concepts may include a protected area 222. Here, the protected area 222 may store data (e.g., secure data) designated, for example, by a user, as needing heightened security, data (e.g., boot data) that is needed for booting, recovery data that is needed for recovery, etc.

According to at least one example embodiment of the inventive concepts, the protected area 222 may be an area that is accessible by the host device 100 only when an authentication operation is successful.

According to at least another example embodiment of the inventive concepts, the protected area 222 may be an area that is writable only when an authentication operation is successful. That is, the protected area 222 may be a read-only area when an authentication operation is not successful. For example, the protected area 222 may be an area that is not viewed by a file system of the user (e.g., the host device 100) as an unmount state and that is accessible by the host program 110, for example, a magician (e.g., Samsung Magician Software) managing the storage device 200. It is possible to read data from the protected area 222, however, according to at least some example embodiments of the inventive concepts, the storage device 200 may require an authentication operation to perform an update or write operation on the protected area 222. According to at least one example embodiment of the inventive concepts, in the case of updating data in the protected area 222, a write operation may add a signature value for the authentication operation to a normal write command.

According to at least one example embodiment of the inventive concepts, the protected area 222 may include a trap file. Here, the trap file may be data that is generated by a manufacturer or a user of the storage device 200 and may be used to detect a malicious access of an attacker. For example, when an access to the trap file of the protected area 222 is made without authentication, the access may be regarded as a malicious access of an attacker.

The computing system 10 according to at least one example embodiment of the inventive concepts may perform a virus/malware detecting operation within the storage device 200, thereby making it possible to tighten security and to reduce monitoring overhead.

The computing system 10 according to at least one example embodiment of the inventive concepts may improve the reliability of virus/malware detection by implementing the storage device 200 that stores the trap file for detecting a malicious access.

The computing system 10 according to at least one example embodiment of the inventive concepts may prevent infection of the whole system in advance by implementing the storage device 200 that includes the protected area 222 for protecting against virus/malware.

Figure 2:
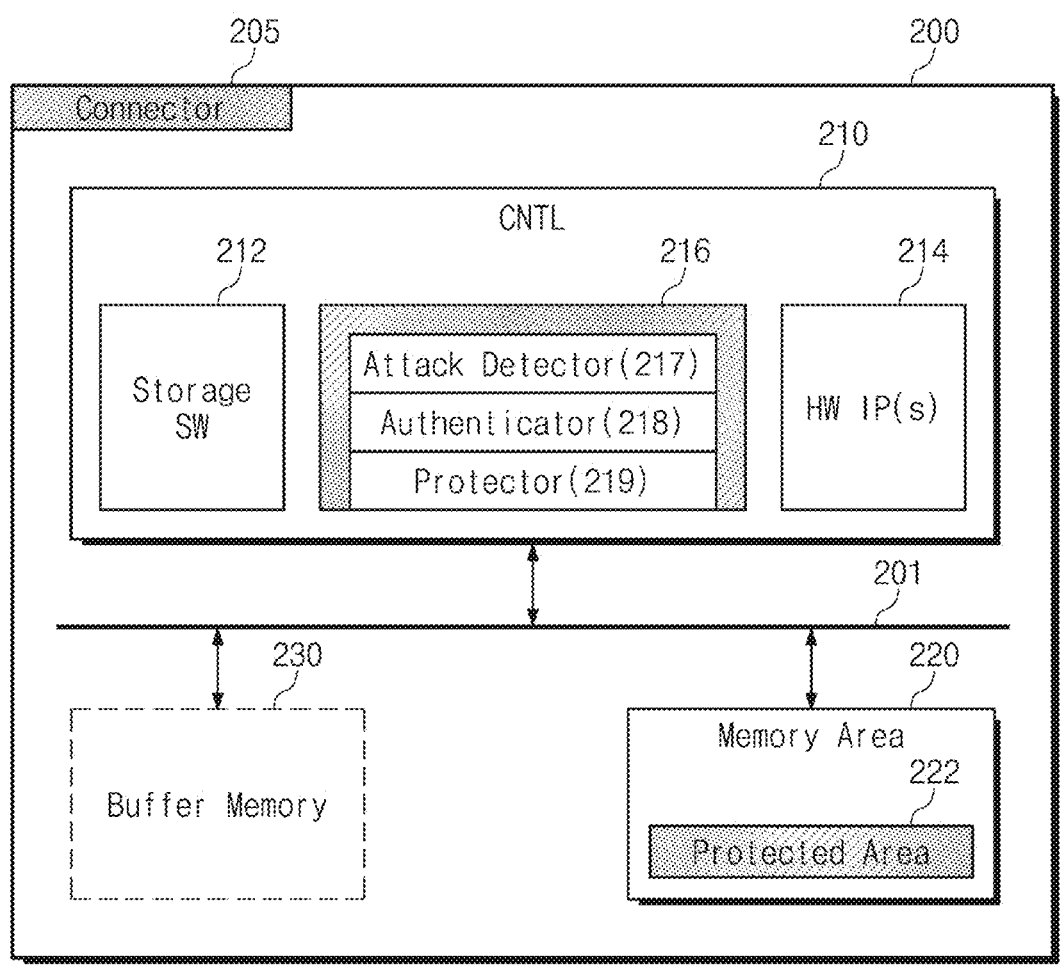
FIG. 2 is a block diagram illustrating a storage device, according to at least one example embodiment of the inventive concepts.

FIG. 2 is a block diagram illustrating the storage device 200, according to at least one example embodiment of the inventive concepts. Referring to FIG. 2, the storage device 200 may include a connector 205, a controller 210, the memory area 220, and a buffer memory 230. The controller 210, the memory area 220, and the buffer memory 230 are connected to a bus 201.

The connector 205 may connect the storage device 200 to external devices, including the host device 100, according to a communication protocol. For example, the communication protocol may be, for example, one or more of double data rate (DDR), non-volatile memory express (NVMe), peripheral component interconnect express (PCIe), serial at attachment (SATA), small computer system interface (SCSI), serial attached SCSI (SAS), universal storage bus USB attached SCSI (UAS), Internet small computer system interface (iSCSI), fiber Channel, fiber channel over Ethernet (FCoE), etc.

The controller 210 may be implemented to control overall operations of the storage device 200. The controller 210 may include storage software (SW) 212, at least one hardware (HW) intellectual property (IP) 214, and an anti-VM unit 216. The HW IP 214 may include, for example, one or more IP cores and/or IP blocks.

The storage SW 212 may be software for managing the memory area 220 and may control a read/write operation of the memory area 220 in response to a received read/write request.

The hardware IP 214 may be hardware (e.g. one or more circuits or circuitry) that is structured to perform operations associated with managing the memory area 220 and may include at least one processor. According to at least one example embodiment of the inventive concepts, the hardware IP 214 may further include an encryption and decryption device which may be implemented by, for example circuitry and/or software for encrypting and decrypting data.

The anti-VM unit 216 may detect viruses or malware in real time and may allow the storage device 200 to enter the protection mode based on the detection result.

The anti-VM unit 216 may include an attack detector 217, an authenticator 218, and a protector 219.

The attack detector 217 may be implemented to detect viruses or malware. According to at least one example embodiment of the inventive concepts, the attack detector 217 may detect viruses or malware by analyzing a pattern of received data. According to at least one example embodiment of the inventive concepts, the attack detector 217 may detect viruses or malware by sensing an access to the trap file or an attempt to modulate the trap file. Meanwhile, it should be appreciated that a way to detect viruses or malware by using the attack detector 217 is not limited to the above-described methods.

The authenticator 218 may be implemented to perform an authentication operation with the host device 100 (refer to FIG. 1). According to at least one example embodiment of the inventive concepts, the authenticator 218 may be implemented to request a certification from the host device 100 or to verify a certification received from the host device 100. According to at least another example embodiment of the inventive concepts, the authenticator 218 may perform the authentication operation by analyzing a password an input by the user through execution of a host program of the host device 100.

According to at least one example embodiment of the inventive concepts, the authenticator 218 may begin the authentication operation with the host device 100 when it is determined that viruses or malware are detected by the attack detector 217.

The protector 219 may determine whether an access of the host device 100 to the storage device is made, whether an access to the memory area 220 is made, whether an access to the protected area 222 is made, or whether an update or write operation on the protected area 222 is made, based on the result of the authentication operation.

According to at least one example embodiment of the inventive concepts, the protector 219 may allow an access to or an update (write) operation on the protected area 222 when the host device 100 is authenticated by the authenticator 218.

According to at least one example embodiment of the inventive concepts, the protector 219 may allow only a read operation on the protected area 222 when the host device 100 is not authenticated by the authenticator 218.

The buffer memory 230 may be implemented to temporarily store data to be written in the memory area 220 or to temporarily store data read from the memory area 220. The buffer memory 230 may be implemented with a volatile memory device or a nonvolatile memory device. For example, the buffer memory 230 may be embodied by one or more of a DRAM, a (SRAM), a phase-change random access memory (PRAM), etc.

Meanwhile, the storage device 200 illustrated in FIG. 2 includes the buffer memory 230, but at least some example embodiments of the inventive concepts are not limited thereto. The storage device 200 according to at least one example embodiment of the inventive concepts may not include a buffer memory.

Figure 3:
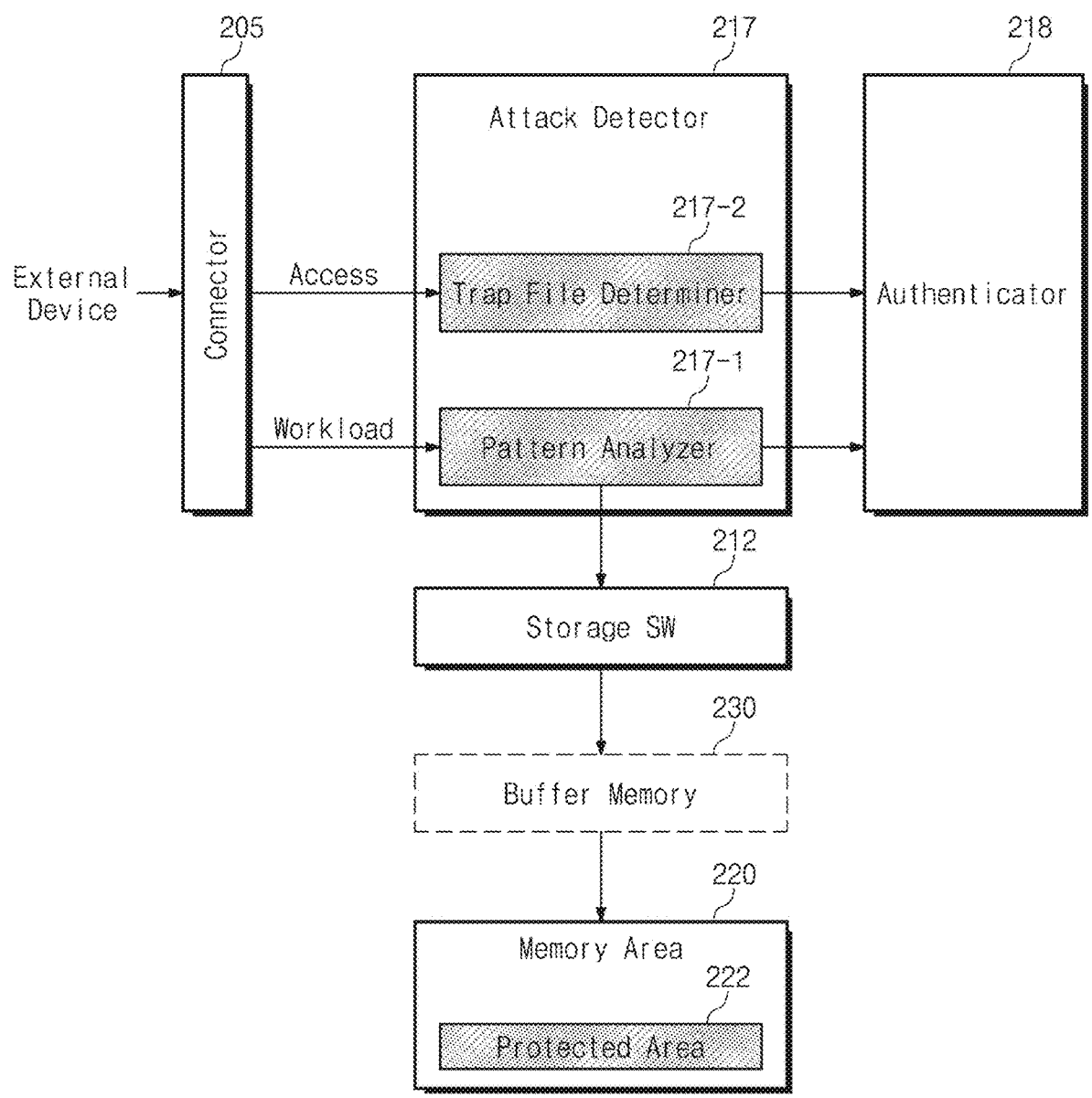
FIG. 3 is a drawing illustrating a virus or malware detecting process of the storage device, according to at least one example embodiment of the inventive concepts.

FIG. 3 is a drawing illustrating a virus or malware detecting process of the storage device 200, according to at least one example embodiment of the inventive concepts. Referring to FIG. 3, the attack detector 217 may detect viruses or malware, for example, in two kinds of methods.

According to a first method, viruses or malware may be detected by analyzing a pattern of received data by a pattern analyzer 217_1. Here, the received data may be a workload output through the connector 205. Virus or malware detection may be made according to whether data of a previously determined pattern is received.

According to a second method, virus or malware detection may be made according to whether an access to a trap file determiner 217_2 is made. The trap file determiner 217_2 is data that is generated by the host program 110 (refer to FIG. 1) and is not viewed by the host device 100 if the authentication operation is not performed. An access to the trap file determiner 217_2 that is made without the authentication operation or when the authentication operation is not successful may be determined as virus or malware detection.

According to at least one example embodiment of the inventive concepts, an attempt to modulate the trap file determiner 217_2 may be determined through virus or malware detection.

As described above, when viruses or malware is detected by the attack detector 217, the authenticator 218 may begin the authentication operation with an external device that requests an access/workload.

Meanwhile, when viruses or malware are not detected by the attack detector 217, the memory area 220 may be normally controlled according to an access/workload request through the storage SW 212.

Meanwhile, the attack detector 217 according to at least one example embodiment of the inventive concepts includes the pattern analyzer 217_1 and the trap file determiner 217_2. However, virus/malware detection of the attack detector 217 according to at least one example embodiment of the inventive concepts may not be limited thereto. The attack detector 217 according to at least one example embodiment of the inventive concepts may not include the pattern analyzer 217_1.

Figure 4:
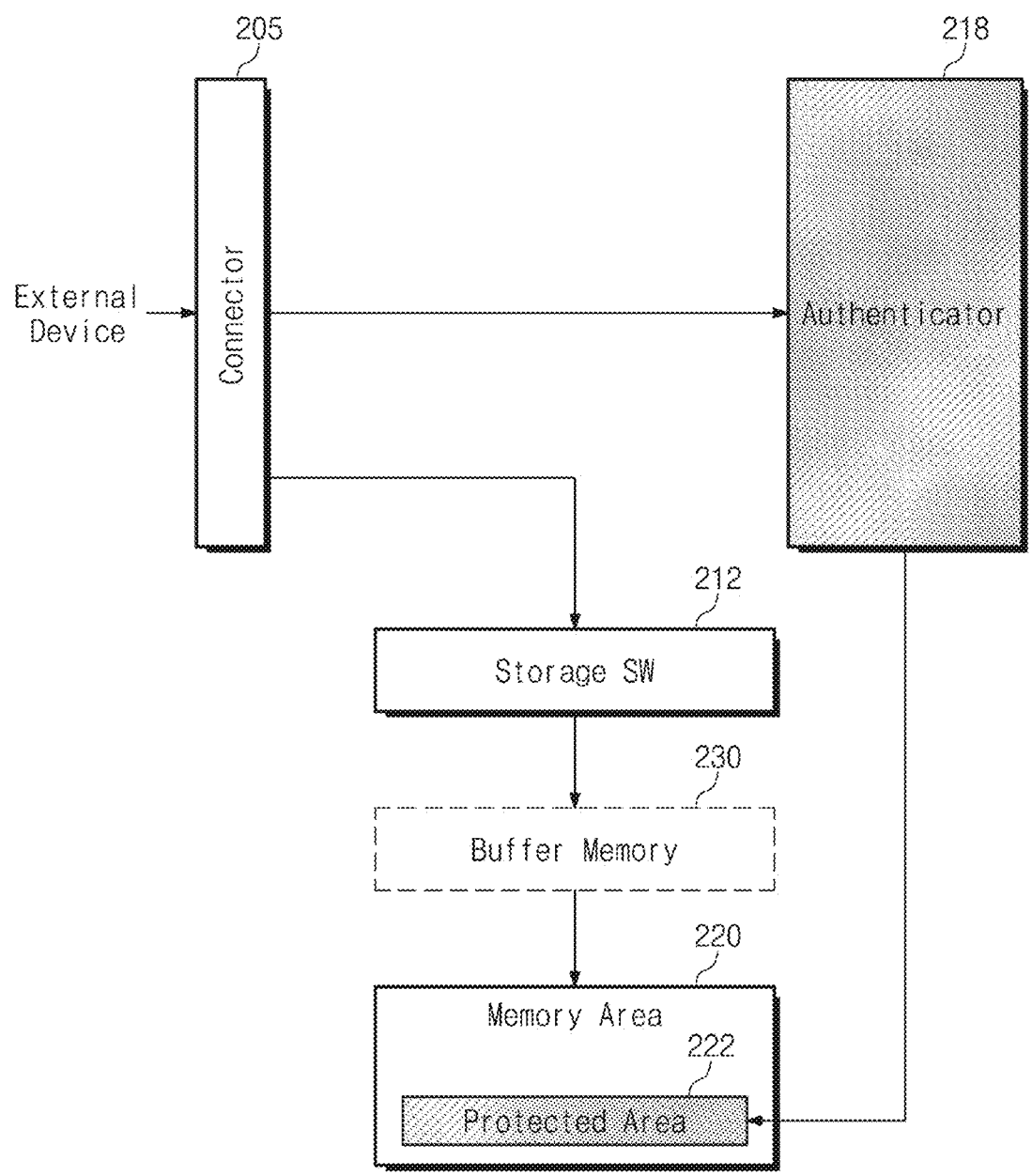
FIG. 4 is a drawing illustrating a process of performing an authentication operation of the storage device, according to at least one example embodiment of the inventive concepts.

FIG. 4 is a drawing illustrating a process of performing an authentication operation of the storage device 200, according to at least one example embodiment of the inventive concepts. Referring to FIG. 4, the authenticator 218 may begin the authentication operation with an external device when the attack detector 217 detects viruses or malware.

According to at least one example embodiment of the inventive concepts, the authenticator 218 may transmit an authentication request to the external device in an asynchronous way (e.g., asynchronously). According to at least one example embodiment of the inventive concepts, the authenticator 218 may transmit the authentication request to the external device through a side band interface. Here, the side band interface may use a management component transport protocol (MCTP). According to at least another example embodiment of the inventive concepts, the host program 110 (refer to FIG. 1) may recognize the authentication request for the external device by causing the host device 100 to poll the storage device 200 periodically. The user may first perform authentication on the external device first before a protection mode operation of the storage device 200.

When the authentication operation is successful, the external device may perform an access or modulation on the protected area 222 through the authenticator 218. When the authentication operation is not successful, the external device may perform a read operation on the memory area 220 but fail to perform a write operation on the memory area 220. For example, the storage device 200 may allow the external device to perform the read operation while preventing the external device from performing the write operation, when the authentication operation is not successful.

Figure 5:
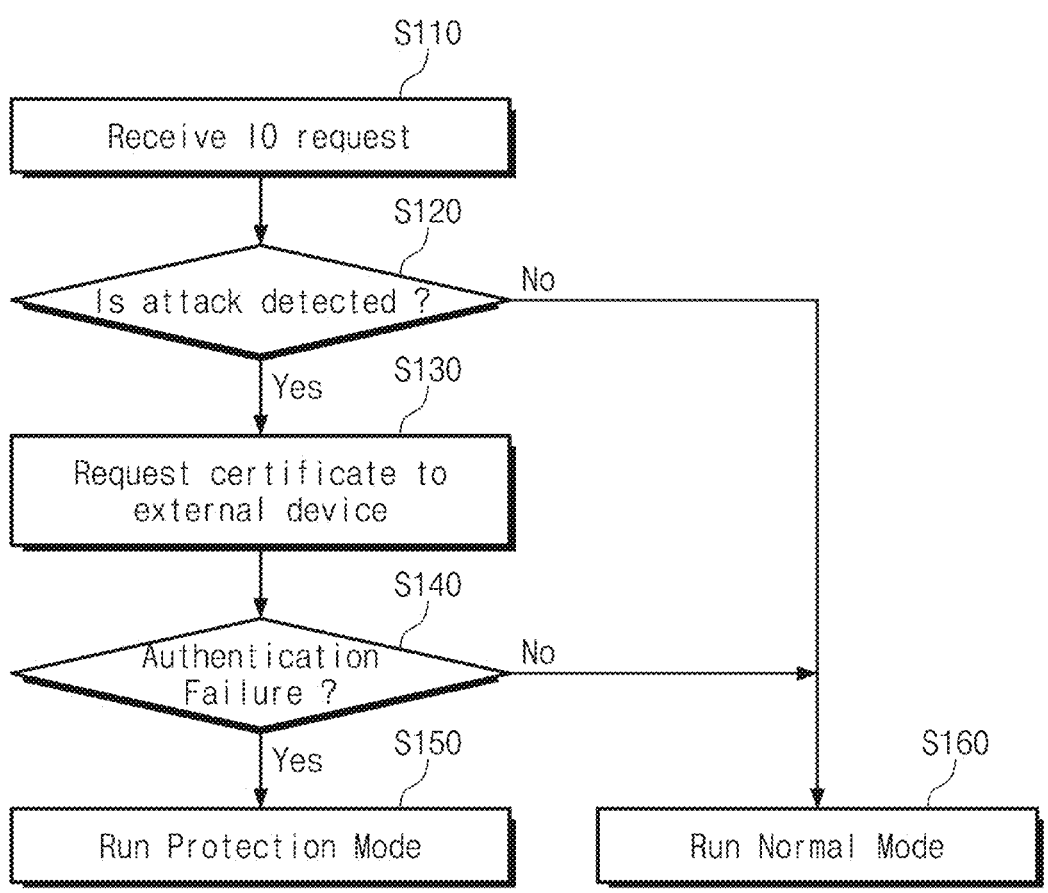
FIG. 5 is a flowchart illustrating a process in which the storage device enters a protection mode, according to at least one example embodiment of the inventive concepts.

FIG. 5 is a flowchart illustrating a process in which the storage device 200 enters a protection mode, according to at least one example embodiment of the inventive concepts. Referring to FIGS. 1 to 5, a process in which the storage device 200 enters a protection mode may be performed as follows.

The storage device 200 may receive an input/output request from an external device (S110). The attack detector 217 of the storage device 200 may perform a virus/malware detecting operation by analyzing an access request or data corresponding to the input/output request. The storage device 200 may determine whether the result of the virus/malware detecting operation indicates that an attack is detected (S120).

If virus/malware is detected, the authenticator 218 of the storage device 200 may request a certification from the external device, for example, by sending an authentication request to the external device (S130). A way to request the certification may be implemented variously as described with reference to FIG. 4. According to at least some example embodiments of the inventive concepts, the storage device may request the certification from the external device (e.g., the host device 100, by transmitting the authentication request to the external device asynchronously. According to at least some example embodiments of the inventive concepts, the external device (e.g., the host device 100) may recognize the request for certification by periodically polling the storage device 200.

The authenticator 218 may receive the certification from the external device and may verify the certification. That is, the authenticator 218 may determine whether an authentication failure occurs (S140).

If the authentication failure occurs, the protector 219 of the storage device 200 may determine the entry into the protection mode. Here, the protection mode may block an access to the storage device 200 within a previously determined time, may set the memory area 220 of the storage device 200 to "read-only" state, may set the protected area 222 of the memory area 220 to "read-only", or may block an access to the protected area 222.

In contrast, if the attack is not detected in operation S120 or if the authentication failure does not occur in operation S140, the storage device 200 may operate in a normal mode.

Figure 6:
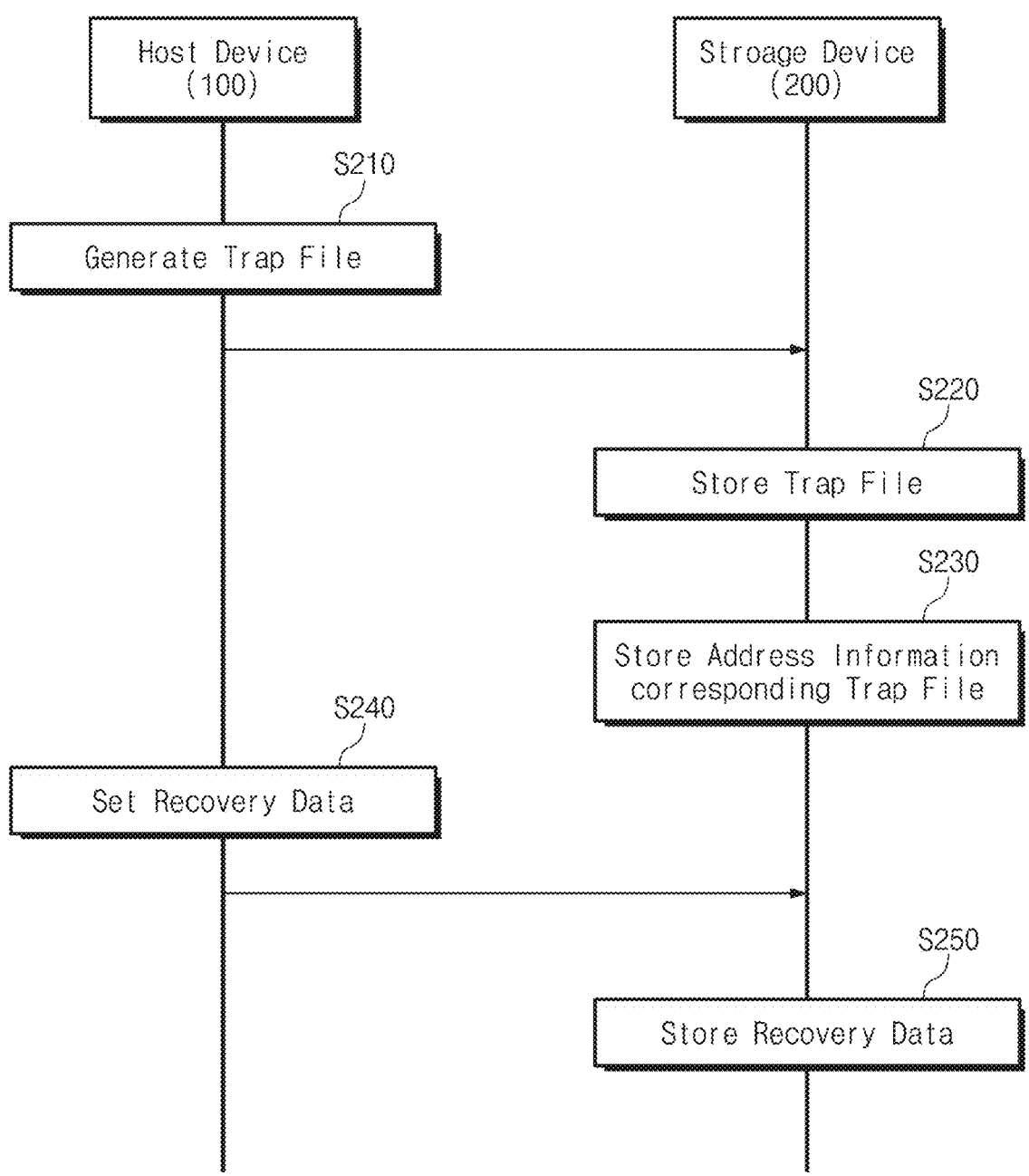
FIG. 6 is a ladder diagram illustrating a process of generating a trap file, according to at least one example embodiment of the inventive concepts.

FIG. 6 is a ladder diagram illustrating a process of generating a trap file, according to at least one example embodiment of the inventive concepts. Referring to FIG. 6, a process of generating a trap file may be performed as follows.

The host program 110 of the host device 100 may generate the trap file for detecting virus/malware (S210). According to at least one example embodiment of the inventive concepts, the size of the trap file may be changed by the user. According to at least another example embodiment of the inventive concepts, the size of the trap file may be fixed. The generated trap file may be stored in the storage device 200 (S220). In this case, the host device 100 may know a logical address at which the trap file is stored. The host device 100 may transmit address information corresponding to the stored trap file to the storage device 200 by using a previously determined command such as a vendor command. The transmitted address information may be stored in the storage device 200 (S230). Afterwards, the storage device 200 may determine whether the external device accesses the trap file, by comparing the received address with the stored address information.

Afterwards, the host program 110 may cause the host device 100 to set recovery data (S240). Here, the recovery data may be boot data needed to boot up the computing system 10 (refer to FIG. 1), private information (e.g., biometric information) of the user, secure data (e.g., data designated by a user of the computing system 10 and/or the storage device 200 as needing heightened security), etc. The recovery data may be stored in the protected area 222 of the storage device 200 (S250). Hereby, the process of generating the trap file may be completed.

Meanwhile, the trap file of FIG. 6 may be generated by the host program 110 of the host device 100. However, embodiments of the inventive concepts may not be limited thereto. The trap file may be previously generated and stored by a manufacturer of the storage device 200, and address information corresponding to the trap file may be also stored. The manufacturer may provide the user of the storage device 200 with the address information corresponding to the trap file.

Figure 7:
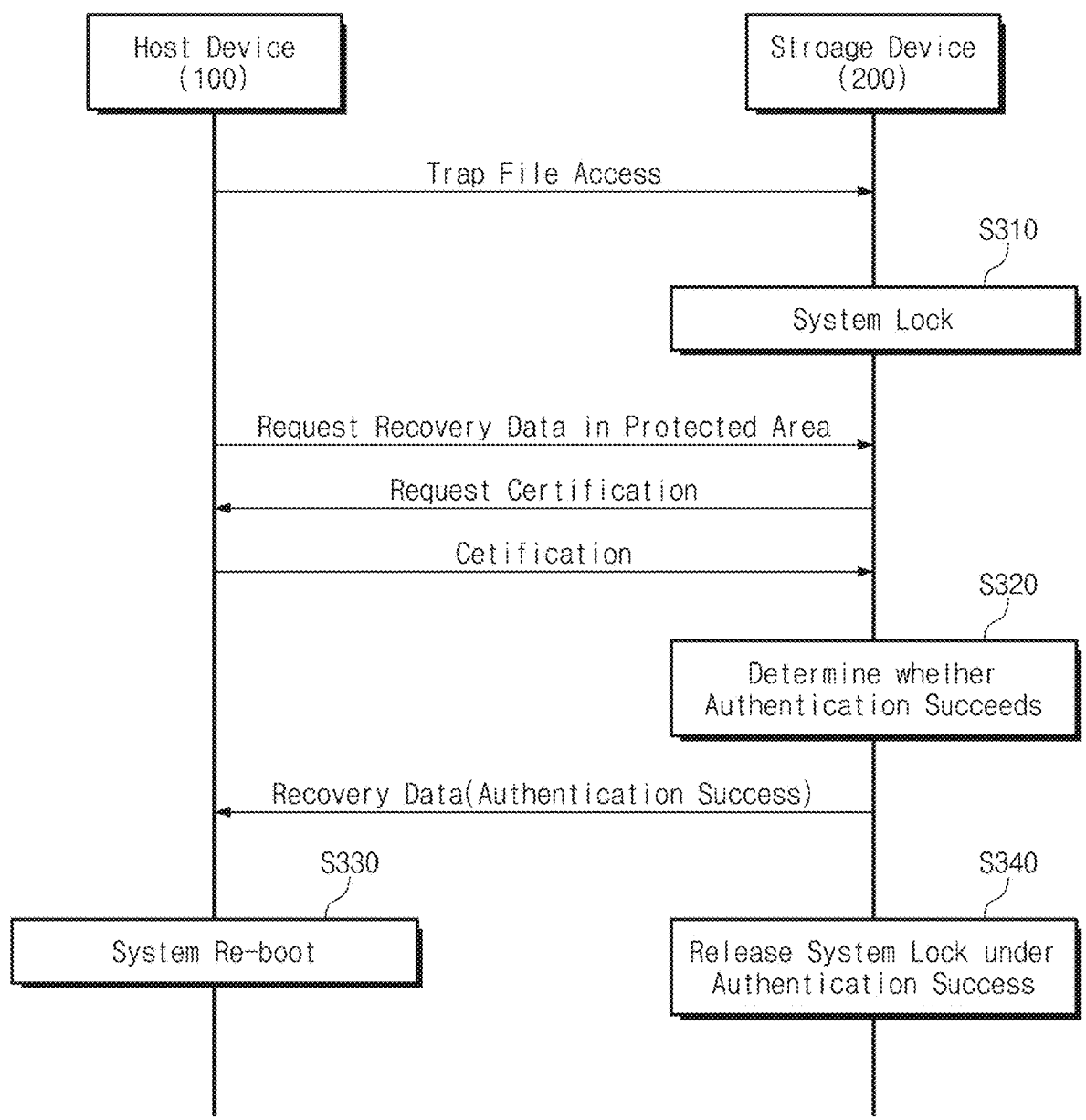
FIG. 7 is a ladder diagram illustrating an operation in which the storage device enters/releases a protection mode, according to at least one example embodiment of the inventive concepts.

FIG. 7 is a ladder diagram illustrating an operation in which the storage device 200 enters/releases a protection mode, according to at least one example embodiment of the inventive concepts. Referring to FIG. 7, an operation in which the storage device 200 enters/releases a protection mode may be performed as follows.

The storage device 200 may receive a request for an access to the trap file from the host device 100 or an external device. Since a file system of the host device 100 does not know an address of the trap file in a normal operation, the probability that the access request corresponds to an illegal attempt may be high. The storage device 200 may perform a system lock operation in response to the access request associated with the trap file (S310). Here, the system lock operation may include transitioning the storage device 200 to a system lock state in which the storage device 200 performs at least one of blocking an access to the storage device 200 during a previously determined time, operating the storage device 200 in a read-only mode, allowing the memory area 220 of the storage device 200 to operate only in the read-only mode, blocking access to at least a portion of the storage device 200, blocking an access to the protected area 222, and those similar thereto.

Afterwards, while the storage device 200 is in the system lock state, the host device 100 may request recovery data (e.g., boot data) of the protected area 222 to perform a data recovery operation. The storage device 200 may request a certification first from the host device 100 in response to the data recovery request. The host device 100 may transfer the certification to the storage device 200 in response to a certification request. The storage device 200 may determine whether the authentication operation is successful, through verification of the received certification (S320). If authentication operation is successful, the storage device 200 may read recovery data stored in the protected area 222 and may transmit the read recovery data to the host device 100. The host device 100 may perform system re-boot by using the transmitted recovery data (S330). For example, the host device 1000 may perform re-booting by using boot data read from the protected area 222 when the authentication operation is successful. Afterwards, the storage device 200 may release the system lock state in response to the successful authentication (S340).

Meanwhile, the storage device 200 may enter the protection mode in response to a request for an access to the trap file. However, embodiments of the inventive concepts may not be limited thereto. According to at least one example embodiment of the inventive concepts, the entry into the protection mode may be made according to whether an attempt to modulate a trap file is made.

Figure 8:
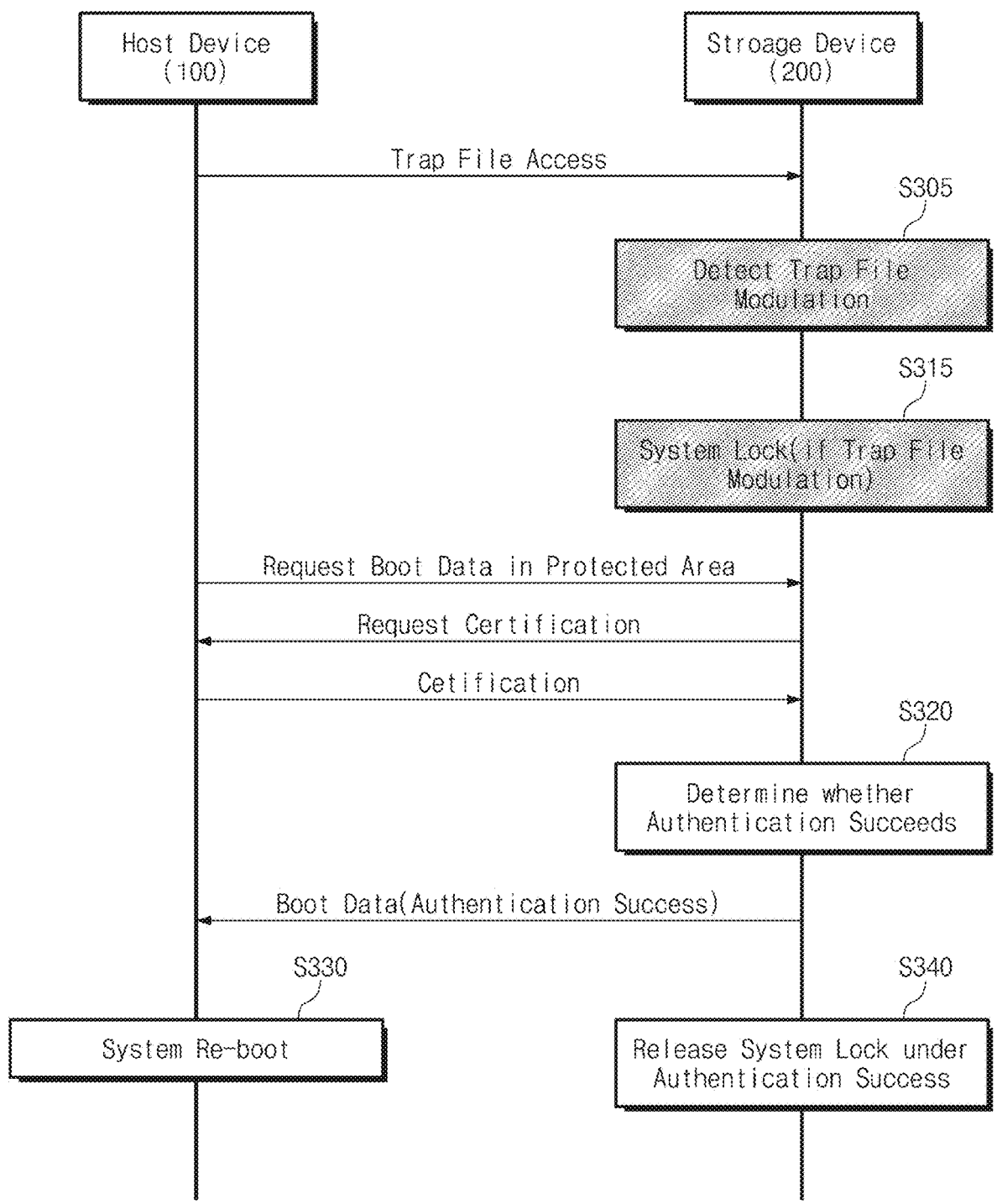
FIG. 8 is a ladder diagram illustrating an operation in which the storage device enters/releases a protection mode, according to at least another example embodiment of the inventive concepts.

FIG. 8 is a ladder diagram illustrating an operation in which the storage device 200 enters/releases a protection mode, according to at least another example embodiment of the inventive concepts. Referring to FIG. 8, the protection mode entering/releasing operation of the storage device 200 illustrated in FIG. 8 may be different than that illustrated in FIG. 7 in that the operation of FIG. 8 includes the storage device 200 detecting whether an attempt to modulate a trap file is made (S305) and the storage device 200 performing the system lock operation (i.e., entering the system lock state) when the attempt to modulate the trap file is detected (S315).

Figure 9:
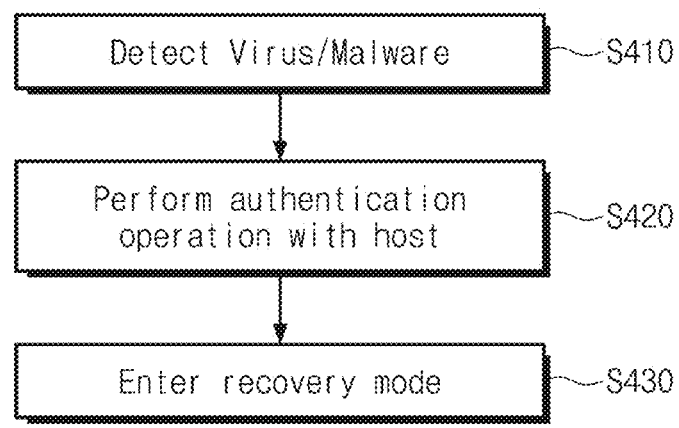
FIG. 9 is a flowchart illustrating an operation in which the storage device enters a recovery mode, according to at least one example embodiment of the inventive concepts.

FIG. 9 is a flowchart illustrating an operation in which the storage device 200 enters a recovery mode, according to at least one example embodiment of the inventive concepts. Referring to FIGS. 1 to 9, an operation in which the storage device 200 enters a recovery mode may be performed as follows.

The storage device 200 may detect virus/malware (S410). Here, the virus/malware detection may be made by analyzing a data pattern or according to an attempt to access/modulate the trap file, as described with reference to FIGS. 1 to 8. If the virus/malware is detected, the storage device 200 may begin the authentication operation with the external device that performs an input/output request (S420). If the authentication failure occurs, the storage device 200 may perform a system lock operation by entering a system lock state. If the authentication operation is successful, the storage device 200 may enter the recovery mode (S430). When entering the recovery mode, may read recovery data needed for a recovery operation from the protected area 222 and may transmit the read data to an external device. According to at least some example embodiments of the inventive concepts, when entering the recovery mode, the storage device 200 may transmit boot data stored in the protected area 222 to an external device (e.g., the host device 100).

Meanwhile, it should be appreciated that the entry into the recovery mode of the storage device 200 according to at least one example embodiment of the inventive concepts is not limited to the method illustrated in FIG. 8.

Figure 10:
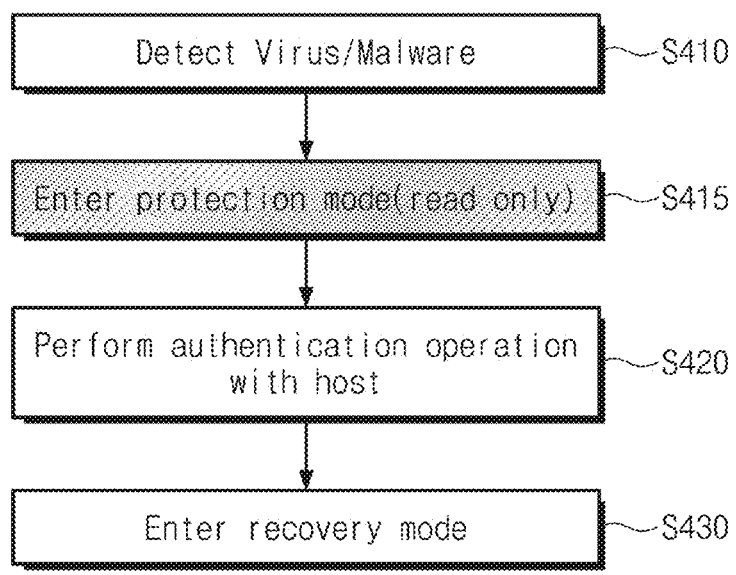
FIG. 10 is a flowchart illustrating an operation in which the storage device enters a recovery mode, according to at least another example embodiment of the inventive concepts.

FIG. 10 is a flowchart illustrating an operation in which the storage device 200 enters a recovery mode, according to at least another example embodiment of the inventive concepts. A recovery mode entering process of the storage device 200 of FIG. 10 may further include operation S415 compared to that of FIG. 9. In operation S415, the storage device 200 may enter a protection mode when detecting virus/malware. Here, the protection mode may correspond to a state in which the storage device 200 prevents write operations (i.e., only a read operation on the storage device 200 is allowable).

Figure 11:
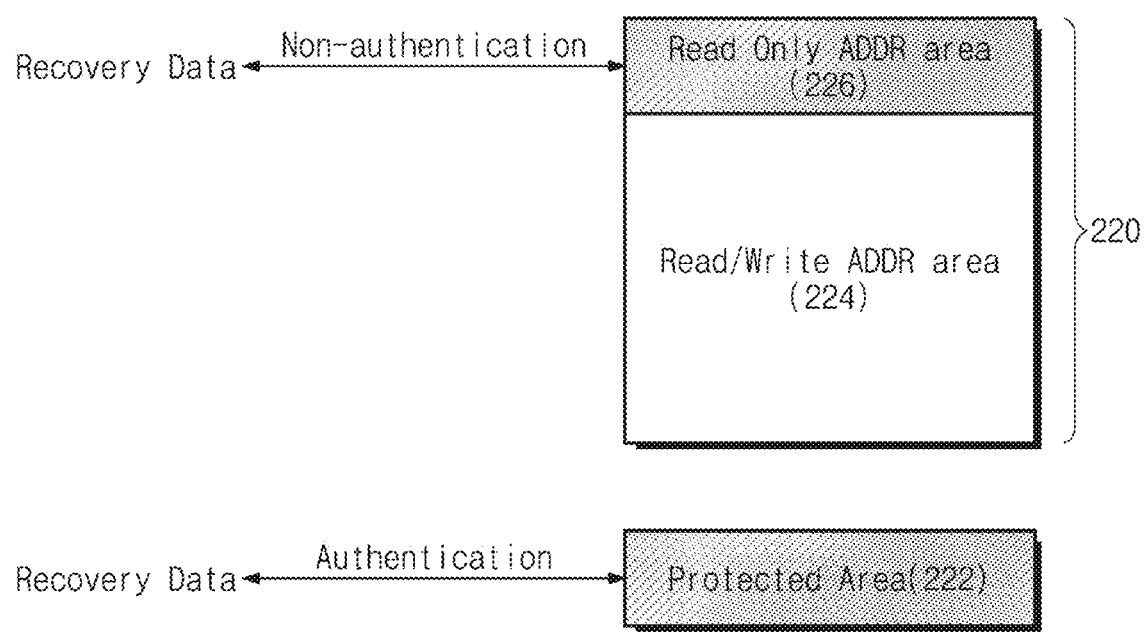
FIG. 11 is a drawing illustrating areas of the storage device, that store recovery data, according to at least one example embodiment of the inventive concepts.

FIG. 11 is a drawing illustrating areas of the storage device 200, in which recovery data are stored, according to at least another example embodiment of the inventive concepts. Referring to FIG. 11, recovery data may be stored in the protected area 222 or a read-only address area 226.

The memory area 220 may include a read/write address area 224, which is accessible even at non-authentication, and the read-only address area 226. An attempt to modulate data stored in the read-only address area 226 may mean the existence of virus/malware.

The protected area 222 is an area that is accessible only when authenticated. An attempt to modulate data stored in the protected area 222 without authentication or an attempt to access the protected area 222 without authentication may mean the existence of virus/malware.

Meanwhile, FIGS. 1 to 11 are described mostly in terms of virus/malware detection. However, at least some example embodiments of the inventive concepts may be described on the basis of whether a hiding device is recognized, from the standpoint of authentication.

Figure 12:
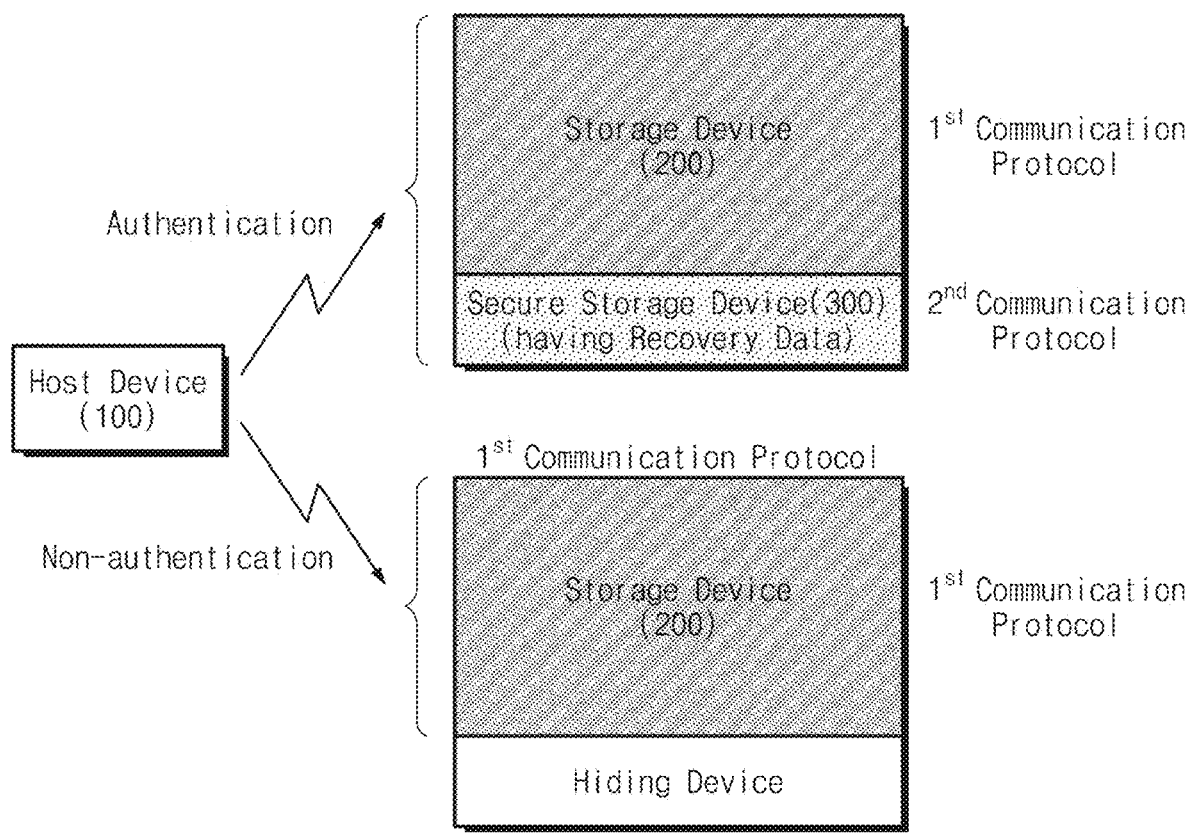
FIG. 12 is a schematic diagram for describing an authentication process of a hiding device, according to at least one example embodiment of the inventive concepts.

FIG. 12 is a schematic diagram for describing an authentication process of a hiding device, according to at least one example embodiment of the inventive concepts. Referring to FIG. 12, a hiding device may not be recognized when the host device 100 is not authenticated. Here, the hiding device may be implemented with a device, in which the hiding device is physically integrated with the storage device 200, as a device associated with the storage device 200. While not authenticated, the host device 100 may transmit an input/output request to the storage device 200 through a first communication protocol.

Also, when the host device 100 is authenticated, the hiding device may be recognized as a secure storage device 300 by the host device 100. The secure storage device 300 may include recovery data. While authenticated, the host device 100 may use the storage device 200 and the secure storage device 300. In this case, the host device 100 may transmit an input/output request to the storage device 200 through the first communication protocol or may transmit the input/output request to the secure storage device 300 through a second communication protocol. For example, the first communication protocol may be different from the second communication protocol. For example, the first communication protocol may be an NVMe protocol, and the second communication protocol may be the side band protocol. As another example, the first communication protocol and the second communication protocol may be the same communication protocol. According to at least some example embodiments of the inventive concepts, the protected area 222 may function as the secure storage device 300 that is recognized when the host device is authenticated.

Meanwhile, embodiments of the inventive concepts may be applicable to a duplication storage device.

Figure 13:
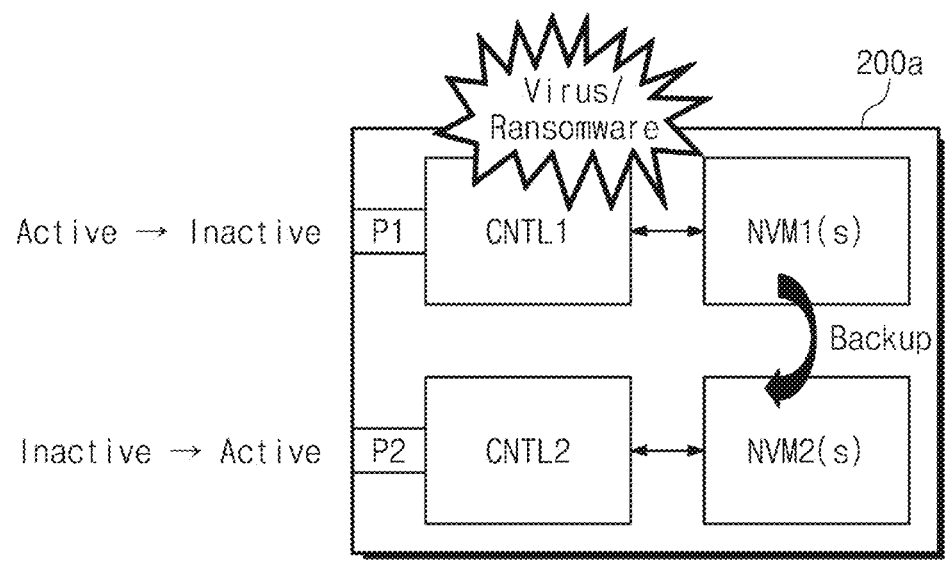
FIG. 13 is a drawing illustrating a duplication storage device, according to at least one example embodiment of the inventive concepts.

FIG. 13 is a drawing illustrating a duplication storage device 200a, according to at least one example embodiment of the inventive concepts. Referring to FIG. 13, the duplication storage device 200a may include at least one first nonvolatile memory device NVM1(s), at least one second nonvolatile memory device NVM2(s), a first memory controller CTNL1 that is connected to a first port P1 to control the at least one first nonvolatile memory device NVM1(s), and a second memory controller CTNL2 that is connected to a second port P2 to control the at least one second nonvolatile memory device NVM2(s).

The first memory controller CTNL1 or the second memory controller CTNL2 may include the anti-VM unit 216 described with reference to FIGS. 1 to 12. For ease of description, below, it is assumed that virus/malware is detected while the first port P1 is activated. When the first memory controller CTNL1 detects virus/malware, the first port P1 may not be activated. In this case, data of the at least one first nonvolatile memory device NVM1(s) may be backed up to the at least one second nonvolatile memory device NVM2(s). Afterwards, the second port P2 may switch from an inactive state to an active state. The host device 100 may continue to access the duplication storage device 200a through the second port P2. Meanwhile, virus/malware that is detected by the first memory controller CTNL1 may be removed by a vaccine (or anti-virus program) corresponding to the detected virus/malware.

Here, each of the at least one first nonvolatile memory device NVM1(s) and the at least one second nonvolatile memory device NVM2(s) may be a NAND flash memory, a vertical NAND flash memory (VNAND), a NOR flash memory, a resistive random access memory (RRAM), a phase-change memory (PRAM), a magneto-resistive RAM (MRAM), a ferroelectric RAM (FRAM), a spin transfer toque RAM (STT-RAM), etc.

Furthermore, the nonvolatile memory may be implemented to have a three-dimensional (3D) array structure. In at least one example embodiment of the inventive concepts, a 3D memory array is provided. The 3D memory array is monolithically formed in one or more physical levels of arrays of memory cells having an active area disposed above a silicon substrate and circuitry associated with the operation of those memory cells, whether such associated circuitry is above or within such substrate. The circuit related on an operation of memory cells may be located in a substrate or on a substrate. The term "monolithic" means that layers of each level of the array are directly deposited on the layers of each underlying level of the array.

In at least one example embodiment of the inventive concepts, the 3D memory array includes vertical NAND strings that are vertically oriented such that at least one memory cell is located over another memory cell. The at least one memory cell may include a charge trap layer. Each vertical NAND string may include at least one selection transistor located over memory cells. At least one selection transistor may have the same structure as those of memory cells and may be monolithically formed together with memory cells.

The three-dimensional memory array is formed of a plurality of levels and has word lines or bit lines shared among levels. The following patent documents, which are hereby incorporated by reference, describe suitable configurations for three-dimensional memory arrays, in which the three-dimensional memory array is configured as a plurality of levels, which is applied by Samsung Electronics Co., with word lines and/or bit lines shared between levels: U.S. Pat. Nos. 7,679,133; 8,553,466; 8,654,587; 8,559,235; and US Pat. Pub. No. 2011/0233648. The nonvolatile memory according to at least some example embodiments of the inventive concepts may be applicable to a charge trap flash (CTF) device in which an insulating layer is used as a charge storage layer, as well as a flash memory device in which a conductive floating gate is used as a charge storage layer.

Embodiments of the inventive concepts may be applicable to the NVDIMM.

Figure 14:
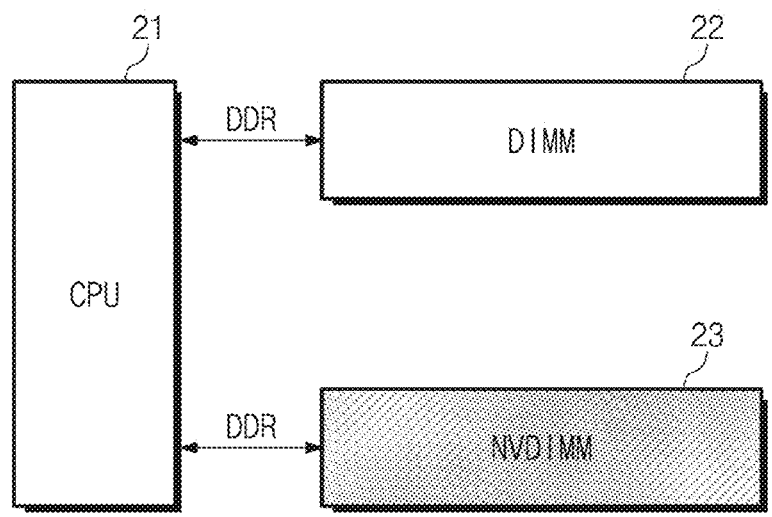
FIG. 14 is a drawing illustrating a computing system, according to at least one example embodiment of the inventive concepts.

FIG. 14 is a drawing illustrating a computing system 20, according to at least one example embodiment of the inventive concepts. Referring to FIG. 14, the computing system 20 may include a processor (CPU) 21, a memory module (e.g., a DIMM) 22, and a nonvolatile memory module (e.g., a NVDIMM) 23.

The processor 21 may be implemented to control overall operations of the computing system 20. The processor 21 may perform various operations of the computing system 20 and may process data. According to at least one example embodiment of the inventive concepts, the processor 21 may include a memory controller for managing the memory module 22 and the nonvolatile memory module 23.

The memory module 22 may be connected to the processor 21 through a double data rate (DDR) interface. According to at least one example embodiment of the inventive concepts, the DDR interface may comply with a memory standard specification of a joint electron device engineering council (JEDEC). Meanwhile, the memory module 22 illustrated in FIG. 14 may be connected to the processor 21 based on the DDR interface. However, embodiments of the inventive concepts are not limited thereto. The memory module 22 may be connected to the processor 21 through various kinds of communication interfaces other than the DDR interface. For example, the communication interfaces may include the NVMe, the PCIe, the SATA, the SCSI, the SAS, the UAS, the iSCSI, the fiber channel, and the FCoE.

According to at least one example embodiment of the inventive concepts, the memory module 22 may be implemented with a DIMM. According to at least one example embodiment of the inventive concepts, the memory module 22 may include at least one DRAM. According to at least one example embodiment of the inventive concepts, the memory module 22 may operate as a cache memory of the nonvolatile memory module 23. According to at least one example embodiment of the inventive concepts, the memory module 22 may include a plurality of cache blocks that store data and tags corresponding to the data. According to at least one example embodiment of the inventive concepts, each of the cache blocks may be implemented with a DRAM.

The nonvolatile memory module 23 may be connected to the processor 21 through the DDR interface. Meanwhile, the nonvolatile memory module 23 illustrated in FIG. 14 is connected to the processor 21 based on the DDR interface. However, at least some example embodiments of the inventive concepts are not limited thereto. The nonvolatile memory module 23 according to at least one example embodiment of the inventive concepts may be connected to the processor 21 through various kinds of communication interfaces except the DDR interface.

The nonvolatile memory module 23 may be implemented with the DIMM. The nonvolatile memory modules 23 may be used as a working memory of the processor 21. The nonvolatile memory module 23 may include at least one nonvolatile memory.

The nonvolatile memory module 23 according to at least one example embodiment of the inventive concepts may include the anti-virus/malware unit 216 described with reference to FIGS. 1 to 13 to detect virus/malware in real time and automatically enter the protection mode based on the detection result.

Meanwhile, the computing system 20 according to at least one example embodiment of the inventive concepts may further include a nonvolatile memory that is based on a DDR-T (transaction) interface.

Figure 15:
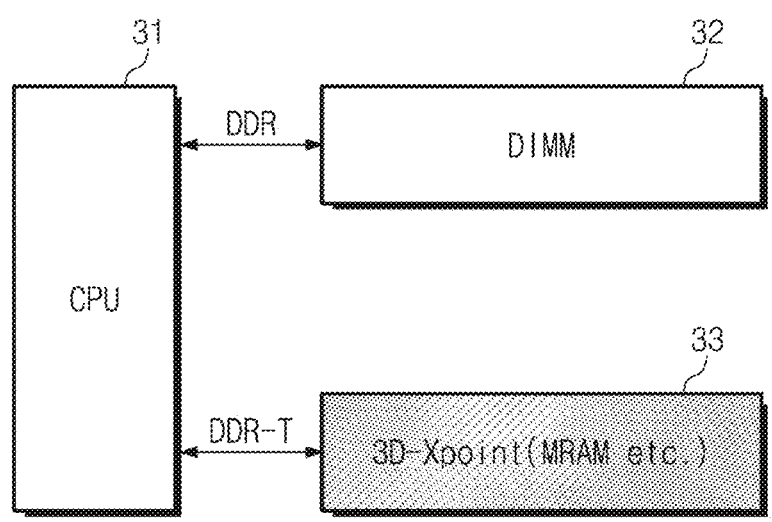
FIG. 15 is a drawing illustrating a computing system, according to at least another example embodiment of the inventive concepts.

FIG. 15 is a drawing illustrating a computing system 30, according to at least another example embodiment of the inventive concepts. Referring to FIG. 15, the computing system 30 may include a processor 31, a memory module (e.g., a DIMM) 32, and a nonvolatile memory 33.

The processor 31 and the memory module 32 may be implemented to be the same as those described with reference to FIG. 14.

The nonvolatile memory 33 may input and output data based on the DDR-T interface. In this case, the memory module 32 may be implemented to perform a cache function of the nonvolatile memory 33. According to at least one example embodiment of the inventive concepts, the nonvolatile memory 33 may be a 3D-Xpoint memory (e.g., 3D MRAM).

Figure 16:
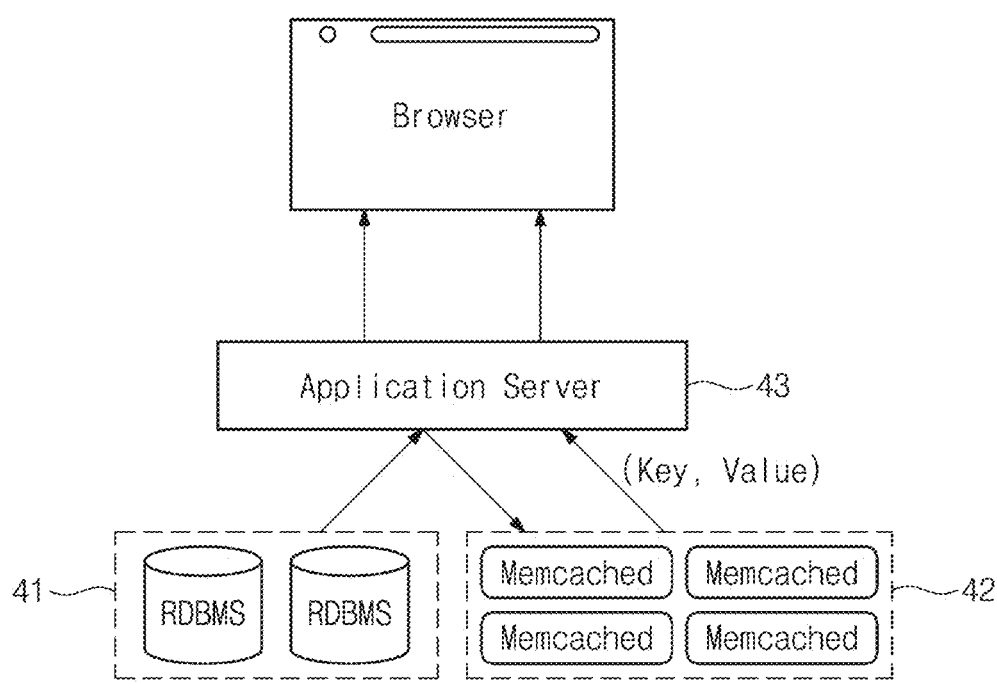
FIG. 16 is a block diagram illustrating a data server system, according to at least another example embodiment of the inventive concepts.

FIG. 16 is a block diagram illustrating a data server system 40, according to at least another example embodiment of the inventive concepts. Referring to FIG. 16, the data server system 40 may include a related database management system (RDBMS) 41, a cache server 42, and an application server 43.

The cache server 42 may be implemented to maintain and delete different key and value pairs in response to an invalidation notification from the related database management system 41.

At least one of the related database management system 41, the cache server 42, and the application server 43 may detect virus/malware as described with reference to FIGS. 1 to 15 and may allow access/modulation of a protected area only through authentication when the virus/malware is detected.

At least some example embodiments of the inventive concepts provide a method of performing detection, authentication, protection, and recovery on an attempt to modulate data in a storage level after ransomware infection.

At least some example embodiments of the inventive concepts may provide a method that is more effective and more efficient than anti-virus software existing only in a conventional host system by providing a method of sensing abnormal file I/O in a storage device and a secure environment (recovery mode) for preventing additional infection and recover infected data, based on information from a host system.

A storage device according to at least one example embodiment of the inventive concepts includes a detector for detecting malicious access and modulation. According to at least one example embodiment of the inventive concepts, the detector may be provided within a system on chip (SoC) of a storage system, which is difficult to modulate. A pattern analyzer detects the malicious access and modulation by analyzing a workload pattern, a trap file detects the malicious access after generating a file, which it is impossible to access normally, to cope with the case where the pattern analyzer does not detect the malicious access and modulation. When the malicious access and modulation is detected, an authenticator is requested to perform authentication.

Also, the storage device according to at least one example embodiment of the inventive concepts includes the authenticator for user authentication. The authenticator according to an embodiment of the inventive exists within the SoC of the storage system and performs an action for authenticating the user when the malicious modulation and access is detected. In addition, the authenticator may use an existing approved authentication technique in a user authentication process to prevent a reply attack and so on.

The storage device according to at least one example embodiment of the inventive concepts further includes a protector for data protection and recovery. The protector according to at least one example embodiment of the inventive concepts may access and update a protected area in storage, and the protected area may be used for data protection and recovery through user authentication and may be inaccessible without authentication. The protected area may be physically/logically continuous with the remaining area of the storage and may be a set of chunks.

The user of the storage system according to at least one example embodiment of the inventive concepts may set data protection and recovery by using the authenticator and the protector that are provided within the SoC allowing very restrictive access and update.

Also, the detector may generate the trap file in a user-inaccessible area and may manage the trap file in a storage level. In the case where it is impossible to prevent an unintended action because a vaccine of the user is infected by malware or virus such as ransomware, if the malware or virus is activated to cause the user damage, the pattern analyzer of the detector may check a command and a data pattern and may detect the malicious access and modulation based on whether an access to the trap file is made.

All requests associated with the storage system are denied until user authentication is completed through the authenticator, and when authentication failure occurs, a recovery mode is executed by the protector. Since it is possible to access and update data managed by the protector only through authentication of the authenticator, file modulation by the malware or virus is impossible, the data managed by the protector may be used for reliable recovery.

Since a virus/malware detecting operation is performed in the storage instead of a host, it is possible to tighten security and reduce monitoring overhead. Compared to an existing pattern analyzer based detection method, accesses of different patterns can be detected by using secure data for malicious access detection. It may be possible to previously prevent the whole system from being infected by setting data and an area, which need protection, to "read-only".

A host program according to at least one example embodiment of the inventive concepts may generate a trap file and may provide an address of the trap file to a storage device. According to at least one example embodiment of the inventive concepts, the storage device may automatically detect data modulation based on the provided address. The embodiments of the inventive concepts provide a recovery mode (write-protected, booting using a recovery area) of the storage device.

According to at least one example embodiment of the inventive concepts, there are provided a storage device, a computing system including the same, and a method thereof for protecting against a virus/malware attack by allowing an attempt to access/modulate a protected area only when authentication with a host device, which is made according to virus/malware detection, is successful. Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A storage device comprising:
a memory area including an area recognizable without authentication of a host device and a protected area that stores a trap file, the protected area configured to be inaccessible to the host device before an authentication operation and to be accessible when the authentication operation with the host device is successful; and
controller configured to control a read/write operation of the memory area in response to receiving an input/output request, to detect malware by analyzing a pattern of data corresponding to the input/output request received from the host device or determining whether the input/output request attempts to access or modulate the trap file, and to initiate a recovery mode when the authentication operation is successful,
wherein the recovery mode includes reading recovery data stored in the protected area and transmitting the recovery data to the host,
wherein the authentication operation is performed when the input/output request attempts to access or modulate the trap file, and
wherein the controller is configured to
detect the malware,
perform the authentication operation when the malware is detected, and
enter a protection mode to protect the memory area or the protected area when the authentication operation is not successful.

2. The storage device of claim 1, wherein the protected area is only accessible through the controller.

3. The storage device of claim 1, wherein the area recognizable without authentication of the host device comprises a read/write area and a read-only area, and
wherein recovery data is stored in the read-only area or the protected area.

4. The storage device of claim 1, wherein the protected area is implemented with a hiding device that is not recognized when the host device is not authenticated, and
wherein the protected area functions as a secure storage device that is recognized when the host device is authenticated.

5. The storage device of claim 4, wherein the host device and the storage device communicate with each other by using a first communication protocol when the host device is not authenticated,
wherein the host device and the storage device communicate with each other by using a second communication protocol when the host device is authenticated, and
wherein the first communication protocol and the second communication protocol are a same communication protocol.

6. The storage device of claim 4, wherein the host device and the storage device communicate with each other by using a first communication protocol when the host device is not authenticated,
wherein the host device and the storage device communicate with each other by using a second communication protocol when the host device is authenticated, and
wherein the first communication protocol and the second communication protocol are different from each other.

7. The storage device of claim 1, further comprising:
at least one first nonvolatile memory device;
at least one second nonvolatile memory device;
a first memory controller connected to a first port to control the at least one first nonvolatile memory device; and
a second memory controller connected to a second port to control the at least one second nonvolatile memory device,
wherein at least one of the at least one first nonvolatile memory device and the at least one second nonvolatile memory device comprises the memory area, and wherein at least one of the first memory controller and the second memory controller comprises the controller.

* * * * *